(12) United States Patent
Min et al.

(10) Patent No.: US 11,330,625 B2
(45) Date of Patent: May 10, 2022

(54) MULTI-BAND BANDWIDTH QUERY REPORT (MB-BQR) SIGNALING IN EXTREMELY HIGH THROUGHPUT (EHT) SYSTEMS

(71) Applicant: Intel Corporation, Santa Clara, CA (US)

(72) Inventors: Alexander W. Min, Portland, OR (US); Dibakar Das, Hilsboro, OR (US); Minyoung Park, San Ramon, CA (US); Chittabrata Ghosh, Fremont, CA (US); Carlos Cordeiro, Portland, OR (US); Cheng Chen, Hillsboro, OR (US); Laurent Cariou, Portland, OR (US); Dmitry Akhmetov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 16/815,604

(22) Filed: Mar. 11, 2020

(65) Prior Publication Data
US 2020/0214036 A1 Jul. 2, 2020

Related U.S. Application Data

(60) Provisional application No. 62/844,242, filed on May 7, 2019, provisional application No. 62/816,651, filed on Mar. 11, 2019.

(51) Int. Cl.
*H04W 74/06* (2009.01)
*H04W 88/10* (2009.01)
(Continued)

(52) U.S. Cl.
CPC ........... *H04W 74/06* (2013.01); *H04L 5/0044* (2013.01); *H04W 28/0268* (2013.01);
(Continued)

(58) Field of Classification Search
CPC . H04W 74/06; H04W 88/10; H04W 72/0446; H04W 72/0406; H04W 48/16;
(Continued)

(56) References Cited

U.S. PATENT DOCUMENTS

| 2019/0387524 A1* | 12/2019 | Asterjadhi | ............ H04W 72/02 |
| 2020/0076519 A1* | 3/2020 | Asterjadhi | ............ H04L 1/0027 |
| 2020/0107393 A1* | 4/2020 | Chu | ...................... H04L 1/0003 |

* cited by examiner

*Primary Examiner* — Thai Nguyen
(74) *Attorney, Agent, or Firm* — Schwegman Lundberg & Woessner, P.A.

(57) ABSTRACT

Embodiments of an access point (AP), station (STA) and method of communication are generally described herein. The AP may be configurable for multi-band operation in a plurality of frequency bands, each frequency band comprising one or more channels. The AP may select a subset of the frequency bands for which the AP is to request per-band channel availability information from the STA. The AP may transmit a Trigger Frame (TF) for a multi-band bandwidth query report polling (MB-BQRP) to request the per-band channel availability information. The AP may receive an uplink frame that includes a multi-band bandwidth query report (MB-BQR) that indicates the per-band channel availability information. The AP may determine, based on the MB-BQR, for an uplink transmission by the STA: one or more frequency bands of the subset of frequency bands, and one or more corresponding channels.

19 Claims, 20 Drawing Sheets

(51) Int. Cl.
*H04W 72/04* (2009.01)
*H04W 48/16* (2009.01)
*H04W 28/02* (2009.01)
*H04W 84/12* (2009.01)
*H04L 5/00* (2006.01)

(52) U.S. Cl.
CPC ....... *H04W 28/0278* (2013.01); *H04W 48/16* (2013.01); *H04W 72/0406* (2013.01); *H04W 72/0446* (2013.01); *H04W 72/0453* (2013.01); *H04W 84/12* (2013.01); *H04W 88/10* (2013.01)

(58) Field of Classification Search
CPC ......... H04W 28/0278; H04W 28/0268; H04W 84/12; H04W 72/0453; H04W 24/10; H04W 72/085; H04W 88/08; H04L 5/0044; H04L 5/0053; H04L 5/001
See application file for complete search history.

1300

1400

1500

| B0 | B1-B7 | B8-B11 | B12 | B13 | B14 | B15-B16 | B17 |
|---|---|---|---|---|---|---|---|
| Reserved | Channel Width Set | Punctured Preamble Rx | Device Class | LDPC Coding In Payload | HE SU PPDU With 1x HE-LTF And 0.8 μs GI | Midamble Tx/Rx Max NSTS | NDP With 4x HE-LTF And 3.2 ms GI |

Bits: 1, 7, 4, 1, 1, 1, 2, 1

| B18 | B19 | B20 | B21 | B22 | B23 | B24-B25 | B26 |
|---|---|---|---|---|---|---|---|
| STBC Tx ≤ 80 MHz | STBC Rx ≤ 80 MHz | Doppler Tx | Doppler Rx | Full Bandwidth UL MU-MIMO | Partial Bandwidth UL MU-MIMO | DCM Max Constellation Tx | DCM Max NSS Tx |

Bits: 1, 1, 1, 1, 1, 1, 2, 1

| B27-B28 | B29 | B30 | B31 | B32 | B33 | B34-B36 | B37-B39 |
|---|---|---|---|---|---|---|---|
| DCM Max Constellation Rx | DCM Max NSS Rx | Rx Partial BW SU Using HE MU PPDU From Non-AP STA (#151-37) | SU Beamformer | SU Beamformee | MU Beamformer | Beamformee STS ≤ 80 MHz | Beamformee STS > 80 MHz |

Bits: 2, 1, 1, 1, 1, 1, 3, 3

| B40-B42 | B43-B45 | B46 | B47 | B48 | B49 | B50 |
|---|---|---|---|---|---|---|
| Number Of Sounding Dimensions ≤ 80 MHz | Number Of Sounding Dimensions > 80 MHz | Ng = 16 SU Feedback | Ng = 16 MU Feedback | Codebook Size (φ, ψ) = {4, 2} SU Feedback | Codebook Size (φ, ψ) = {7, 5} MU Feedback | Triggered SU Beamforming Feedback |

Bits: 3, 3, 1, 1, 1, 1, 1

FIG. 15A

| B51 | B52 | B53 | B54 | B55 | B56 | B57 | B58 |
|---|---|---|---|---|---|---|---|
| Triggered MU Beamforming Partial BW Feedback | Triggered CQI Feedback | Partial Bandwidth Extended Range | Partial Bandwidth DL MU-MIMO | PPE Thresholds Present(B1 B321) | SRP-based SR Support | Power Boost Factor Support | HE SU PPDU And HE MU PPDU With 4x HE-LTF And 0.8 μs GI |
| Bits: 1 | 1 | 1 | 1 | 1 | 1 | 1 | 1 |

| B59 B61 | B62 | B63 | B64 | B65 | B66 | B67 | B68 |
|---|---|---|---|---|---|---|---|
| Max Nc | STBC Tx > 80 MHz | STBC Rx > 80 MHz | HE ER SU PPDU With 4x HE-LTF And 0.8 μs GI | 20 MHz In 40 MHz HE PPDU In 2.4 GHz Band | 20 MHz In 160/ 80+80 MHz HE PPDU | 80 MHz In 160/ 80+80 MHz HE PPDU | HE ER SU PPDU With 1x HE-LTF And 0.8 μs GI |
| Bits: 3 | 1 | 1 | 1 | 1 | 1 | 1 | 1 |

| B69 | B70 B71 | B72 | B73 | B74 | B75 | B76 | B77 | B78 B87 |
|---|---|---|---|---|---|---|---|---|
| Midamble Tx/Rx 2x And 1x HE-LTF | DCM Max BW | Longer Than 16 HE SIG-B OFDM Symbols Support | Non-Triggered CQI Feedback | Tx 1024-QAM < 242-tone RU Support | Rx 1024-QAM < 242-tone RU Support | Rx Full BW SU Using HE MU PPDU With Compressed SIGB | Rx Full BW SU Using HE MU PPDU With Non-Compressed SIGB | Reserved |
| Bits: 1 | 2 | 1 | 1 | 1 | 1 | 1 | 1 | 10 |

FIG. 15B

1600
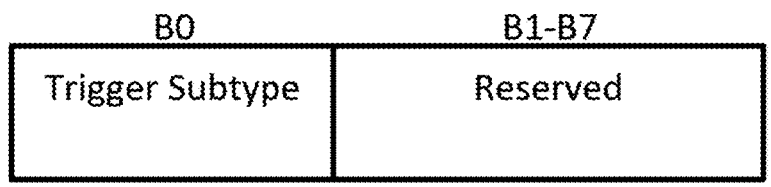
1630
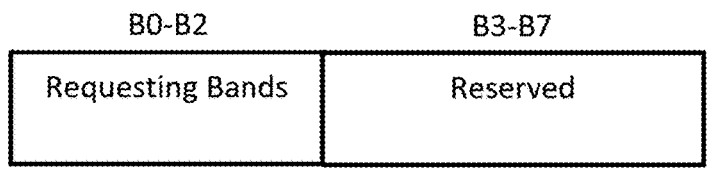
1660
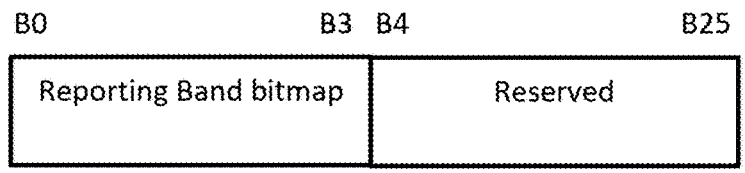
1680
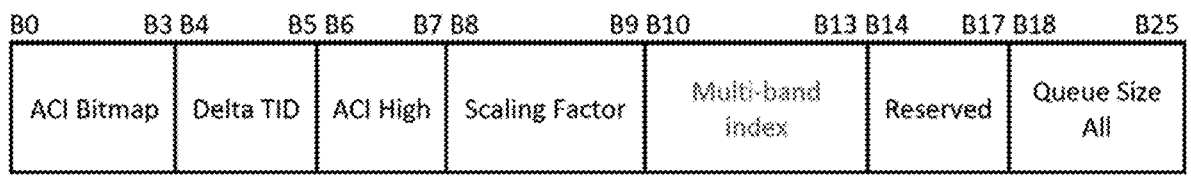
FIG. 16

1700

| Multi-band Info Bitmap | TID for Band 1 | Queue size for Band 1 | TID for Band 2 | Queue size for Band 2 |
|---|---|---|---|---|
| B0 | B1 B2 — B5 | B6 — B13 | B14 — B17 | B18 — B25 |

1720

| Multi-band Info Bitmap | TID for other band | Queue size for other band | Reserved |
|---|---|---|---|

1740

| Multi-band Info Bitmap | TID for other band | Queue size for other band | Subcontrol ID | UL Power Headroom |
|---|---|---|---|---|
| B0 | B1 B2 — B5 | B6 — B13 | B14 — B17 | B18 — B25 |

| B0 | B2 B3 | B4 | B5 | B6 B8 | B9 | B10 | B11 | B12 B25 |
|---|---|---|---|---|---|---|---|---|
| Rx NSS | Channel Width | UL MU Disable | Tx NSTS | ER SU Disable | DL MU-MIMO Resound Reccomendation | UL MU Data Disable | Max OMI Change Time | |

1820

| B0 | B2 B3 | B4 | B5 | B6 B8 | B9 | B10 | B11 | B12 B20 | B21 B25 |
|---|---|---|---|---|---|---|---|---|---|
| Rx NSS | Channel Width | UL MU Disable | Tx NSTS | ER SU Disable | DL MU-MIMO Resound Reccomendation | UL MU Data Disable | Max OMI Change Time | Current OMI Duration | |

1840

| B0 | B2 B3 | B4 | B5 | B6 B8 | B9 | B10 | B11 | B12 B25 |
|---|---|---|---|---|---|---|---|---|
| Rx NSS | Channel Width | UL MU Disable | Tx NSTS | ER SU Disable | DL MU-MIMO Resound Reccomendation | UL MU Data Disable | NSS per Band | |

1860

| B0 | B1 B2 | B3 B4 | B5 B6 | B7 B8 | B9 B10 | B11 |
|---|---|---|---|---|---|---|
| Rx NSS | NSS in Band 1 | NSS in Band 2 | NSS in Band 3 | NSS in Band 4 | NSS in Band 5 | |

| Band ID/bitmap | Rx NSS | Channel Width | UL MU Disable | Tx NSTS | ER SU Disable | DL MU-MIMO Resound Reccomendation | UL MU Data Disable | Reserved |
|---|---|---|---|---|---|---|---|---|
| Bits: 8 | 4 | 3 | 1 | 4 | 1 | 1 | 1 | 3 |

| Control ID value | Meaning | Length of the Control Information subfield (bits) |
|---|---|---|
| 7 | Multi-band index | 10 |
| 8-15 | Reserved | |

| Band ID/bitmap | MSB of Rx NSS | MSB of Tx NSS | MSB of Channel Width |
|---|---|---|---|
| Bits: 7 | 1 | 1 | 1 |

| Control ID value | Meaning | Length of the Control Information subfield (bits) |
|---|---|---|
| 8 | EHT Band Switch | 12 |
| 9-15 | Reserved | |

| Continue operation in current band | Band switch time | TID Transferred | Reserved |
|---|---|---|---|
| Bits: 1 | 4 | 4 | 3 |

2400

MULTI-BAND BANDWIDTH QUERY REPORT (MB-BQR) SIGNALING IN EXTREMELY HIGH THROUGHPUT (EHT) SYSTEMS

PRIORITY CLAIM

This application claims priority under 35 USC 119(e) to U.S. Provisional Patent Application Ser. No. 62/816,651, filed Mar. 11, 2019, [reference number AC0104-Z, 1884.A15PRV], and to U.S. Provisional Patent Application Ser. No. 62/844,242, filed May 7, 2019 [reference number AC0104-Z2, 1884.A15PV2], both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for multi-band bandwidth query report (MB-BQR) signaling in EHT systems.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 15A illustrates example elements in accordance with some embodiments;

FIG. 15B illustrates example elements in accordance with some embodiments;

FIG. 16 illustrates example elements in accordance with some embodiments;

FIG. 17 illustrates example elements in accordance with some embodiments;

FIG. 18 illustrates example elements in accordance with some embodiments;

FIG. 21 illustrates example elements in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
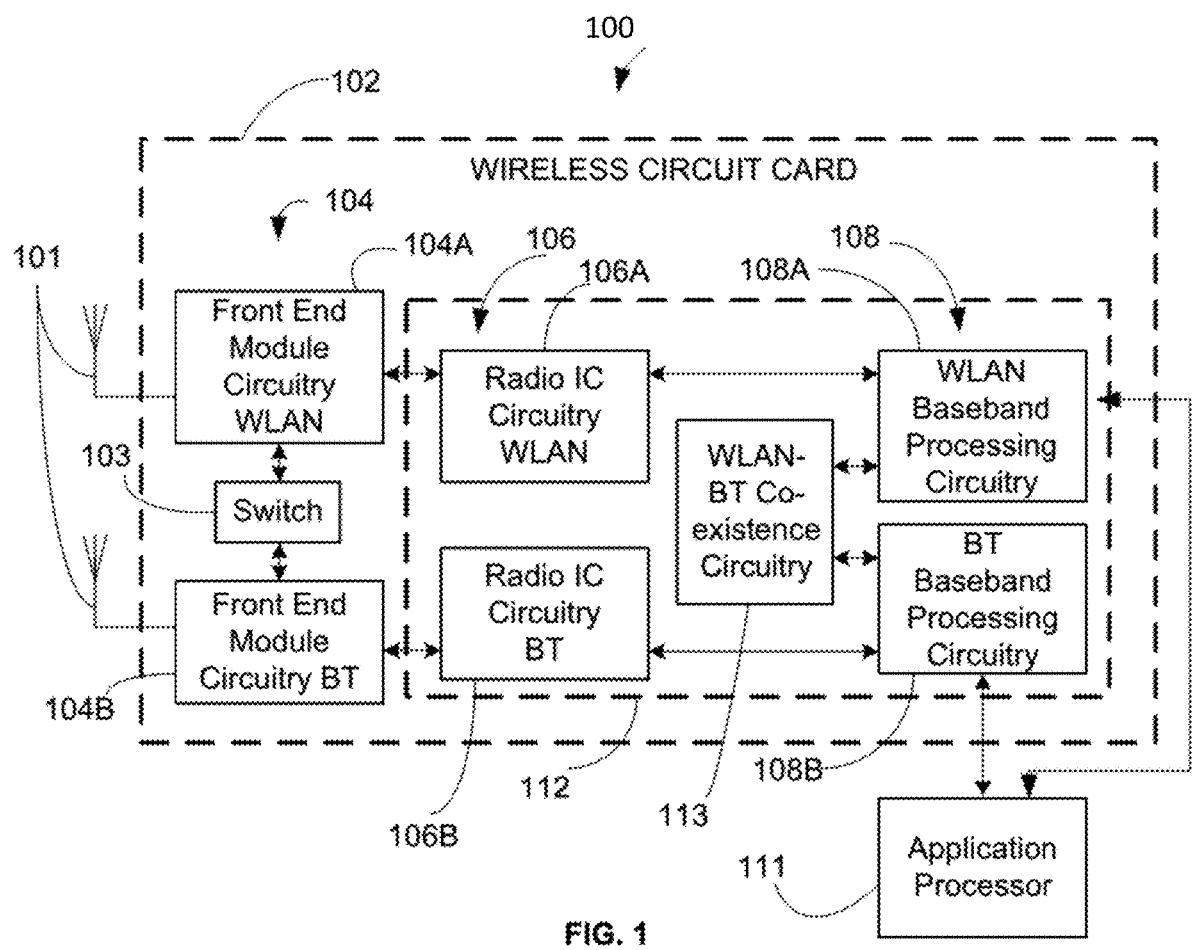
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
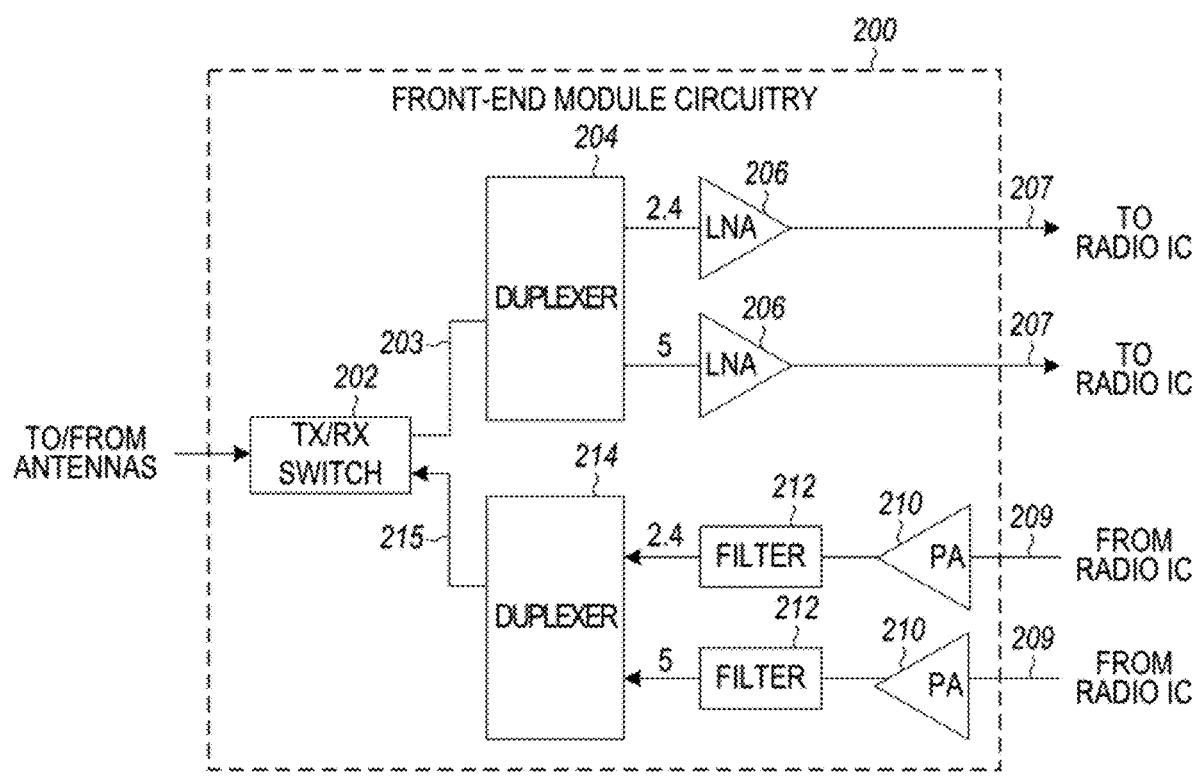
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
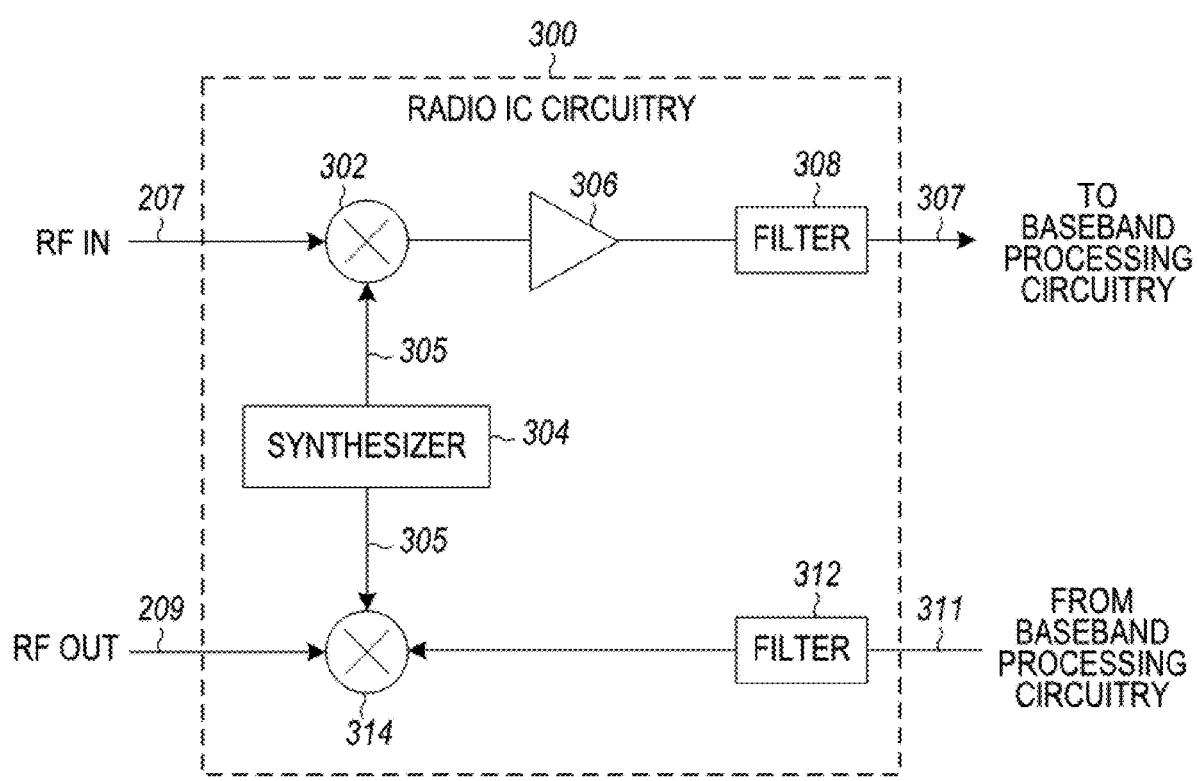
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
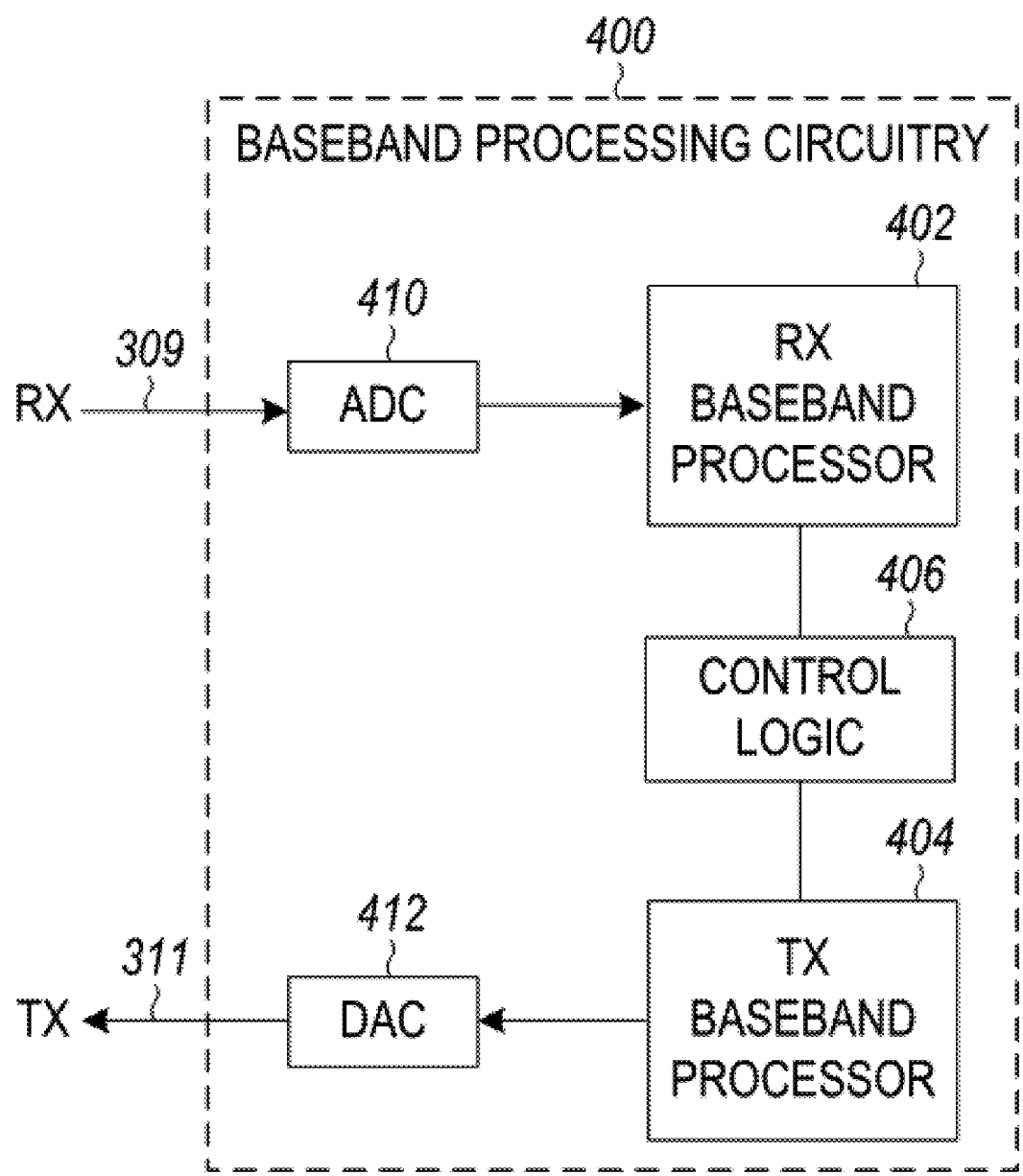
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
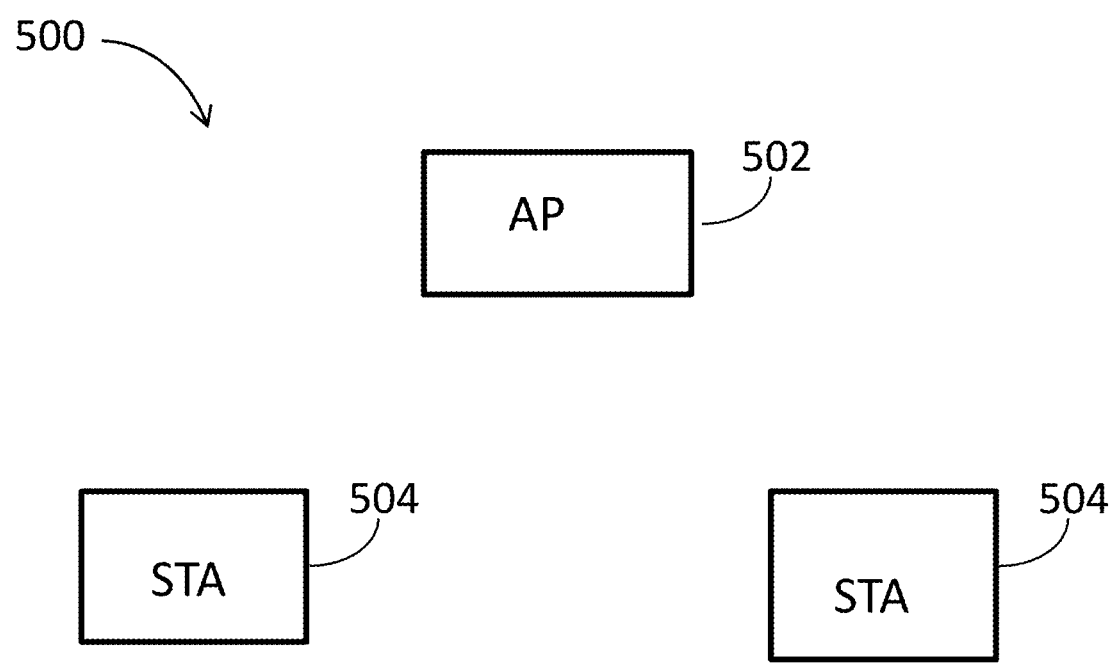
FIG. 5 illustrates a WLAN in accordance with some embodiments.

FIG. 5 illustrates a WLAN 500 in accordance with some embodiments. In some embodiments, the WLAN 500 may comprise an AP 502, and one or more stations (STAs) 504. Embodiments are not limited to the number of elements (such as APs 502, STAs 504 and/or other) shown in FIG. 5.

In some embodiments, the AP 502 may communicate with one or more of the STAs 504. Embodiments are not limited to a single AP 502, as the WLAN 500 may comprise one or more APs 502, in some embodiments. In some embodiments, the AP 502 may be a base station. The AP 502 and/or STAs 504 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The AP 502 and/or STAs 504 may operate in accordance with one or more of IEEE 802.11 a/b/g/n/ac/ad/af/ah/aj/ay, EHT, or another legacy wireless communication standard. In some embodiments, the STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the AP 502, STA 504, and/or other device may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with one or more of the figures described herein.

In example embodiments, the STA 504 and/or the AP 502 are configured to perform the methods and operations/functions described herein in conjunction with one or more of the figures described herein. In example embodiments, an apparatus of the STA 504 and/or an apparatus of the AP 502 are configured to perform the methods and functions described herein in conjunction with one or more of the figures described herein. The term Wi-Fi may refer to one or more of the IEEE 802.11 communication standards.

Figure 6:
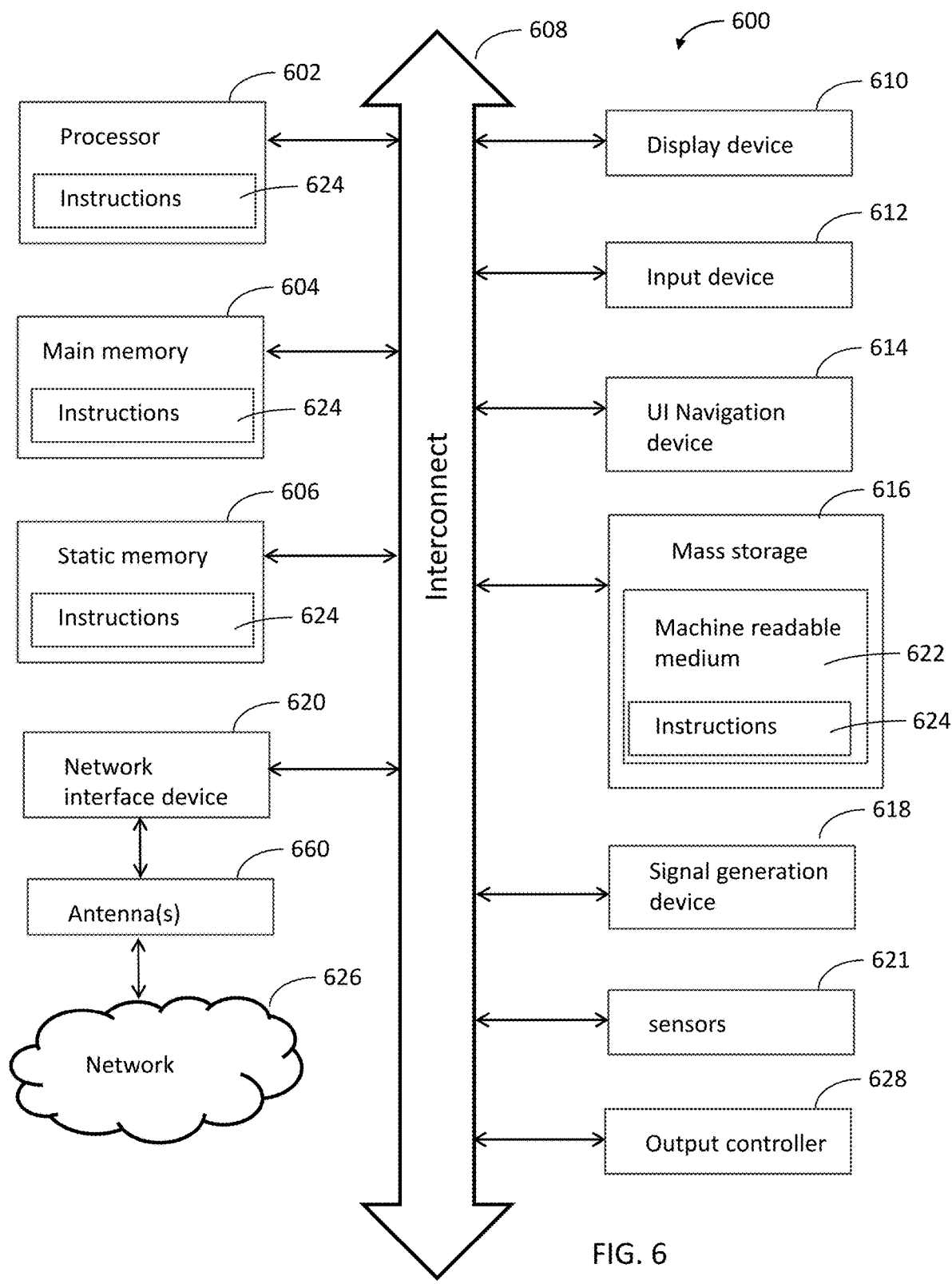
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
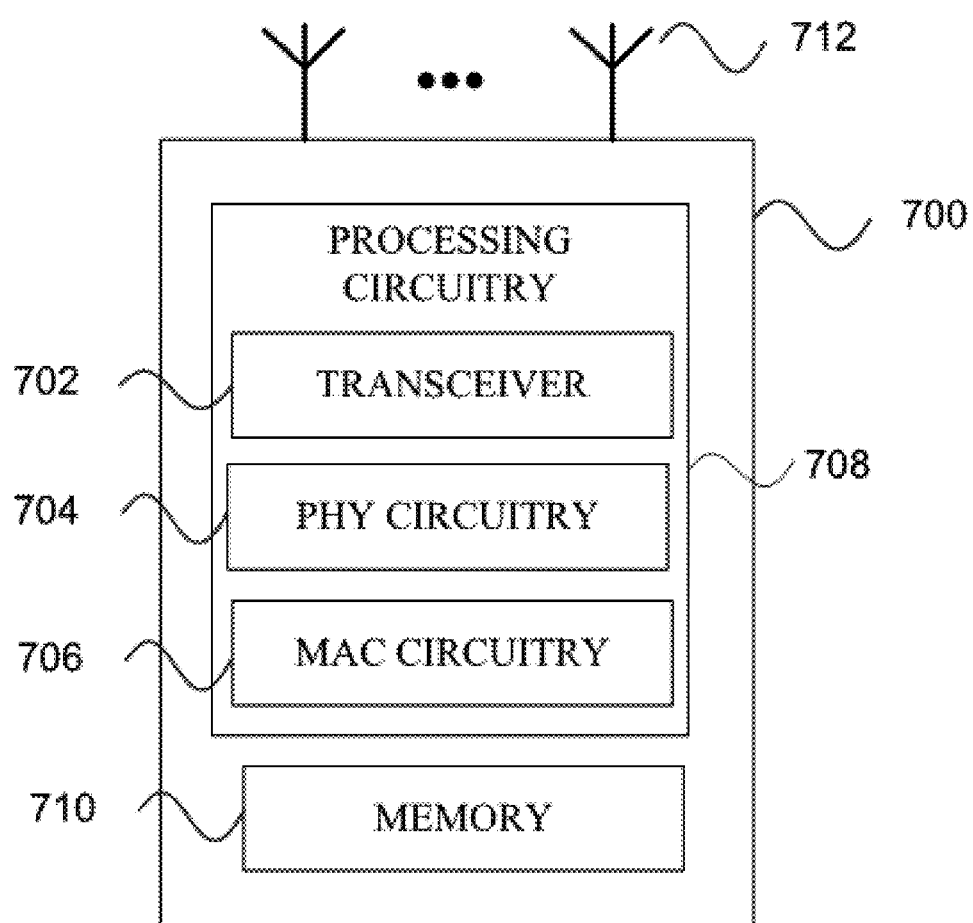
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the AP 502 may be configurable for multi-band operation in a plurality of frequency bands. Each of the frequency bands may comprise one or more channels. The AP 502 may, from the plurality of frequency bands, select a subset of frequency bands for which the AP 502 is to request per-band channel availability information from the STA 504. The AP 502 may transmit a Trigger Frame (TF) for a multi-band bandwidth query report polling (MB-BQRP) to request the per-band channel availability information. The AP 502 may encode the TF to indicate the subset of frequency bands. The AP 502 may receive, from the STA 504, an uplink frame that includes a multi-band bandwidth query report (MB-BQR) that indicates the per-band channel availability information. The AP 502 may determine, based on the MB-BQR, for an uplink transmission by the STA 504: one or more frequency bands of the subset of frequency bands, and one or more corresponding channels. These embodiments are described in more detail below.

Figure 8:
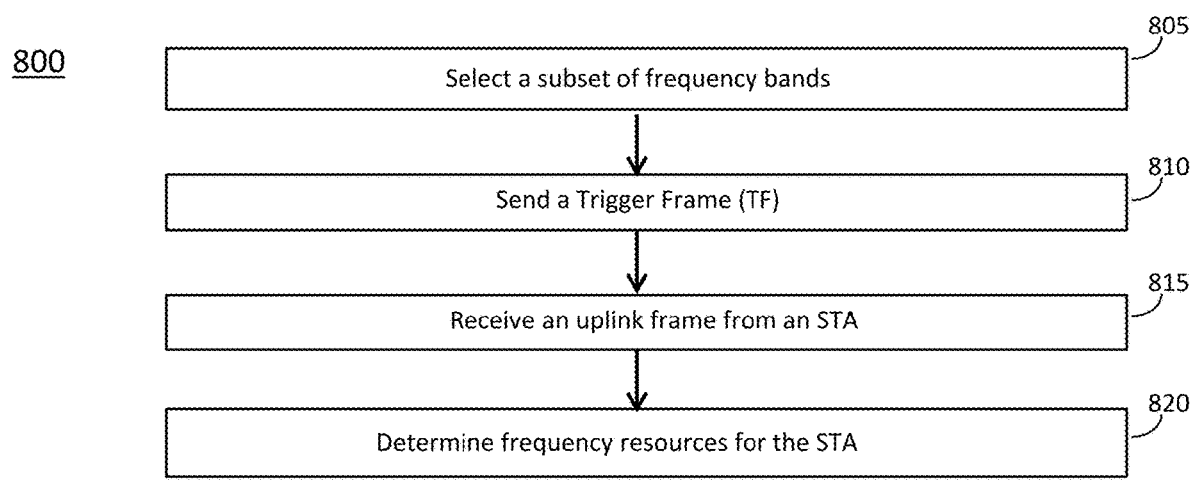
FIG. 8 illustrates the operation of a method in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In descriptions of the method 800, reference may be made to one or more figures, although it is understood that the method 800 may be practiced with any other suitable systems, interfaces and components.

In some embodiments, an AP 502 may perform one or more operations of the method 800, but embodiments are not limited to performance of the method 800 and/or operations of it by the AP 502. In some embodiments, another device and/or component may perform one or more operations that may be the same as, similar to and/or reciprocal to one or more operations of the method 800. In a non-limiting example, the STA 504 may perform one or more operations that may be the same as, similar to, reciprocal to and/or related to one or more operations of the method 800, in some embodiments. In a non-limiting example, another device may perform one or more operations that may be the same as, similar to, reciprocal to and/or related to one or more operations of the method 800, in some embodiments.

The method 800 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 and/or other method described herein may also be applicable to an apparatus of an AP 502, an apparatus of a STA 504 and/or an apparatus of another device. In some embodiments, an apparatus of a STA 504 may perform one or more operations of the method 800 and/or other operations. In some embodiments, an apparatus of an AP 502 may perform one or more operations that may be the same as, similar to, reciprocal to and/or related to one or more operations described herein.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards. In some embodiments, the AP 502 and/or STA 504 may be configured to operate in accordance with an EHT protocol and/or EHT technique(s).

At operation 805, the AP 502 may select a subset of frequency bands. At operation 810, the AP 502 may send a Trigger Frame (TF). At operation 815, the AP 502 may receive an uplink frame from an STA 504. At operation 820, the AP 502 may determine frequency resources (such as frequency bands, channels and/or other) for the STA 504.

In some embodiments, the AP 502 may be configurable for multi-band operation in a plurality of frequency bands. In some embodiments, each of the frequency bands may comprise one or more channels. In some embodiments, the AP 502 may select, from the plurality of frequency bands, a subset of frequency bands for which the AP 502 is to request per-band channel availability information from the STA 504. In some embodiments, the AP 502 may transmit a Trigger Frame (TF) for a multi-band bandwidth query report polling (MB-BQRP) to request the per-band channel availability information. In some embodiments, the AP 502 may encode the TF to indicate the subset of frequency bands. In some embodiments, the AP 502 may receive, from the STA 504, an uplink frame that includes a multi-band bandwidth query report (MB-BQR) that indicates the per-band channel availability information. In some embodiments, the AP 502 may determine, based on the MB-BQR, for an uplink transmission by the STA 504, one or more of: one or more frequency bands of the subset of frequency bands; one or more corresponding channels; and/or other. In some embodiments, the information described above (one or more of: one or more frequency bands of the subset of frequency bands; one or more corresponding channels; and/or other) may be determined for one or more of: an uplink transmission by the STA 504; a downlink transmission by the STA; and/or other In some embodiments, the AP 502 may encode the TF to include a TF type parameter. In some embodiments, the TF type parameter may be configurable to indicate that the TF is for the MB-BQRP.

In some embodiments, the AP 502 may encode the TF to include a Trigger Dependent User Information subfield that includes a target band bitmap parameter. In some embodiments, the AP 502 may encode the target band bitmap parameter to indicate the subset of frequency bands.

In some embodiments, the uplink frame may be one or more of: a quality-of-service (QoS) null frame; a QoS data frame; and/or other.

In some embodiments, the MB-BQR may be included in a control-A field of the uplink frame. In some embodiments, the MB-BQR may include a control subfield for each frequency band of the subset of frequency bands. In some embodiments, the control subfield may include a channel bitmap that indicates the channel availability information of the corresponding frequency band. In some embodiments, the control ID field of the uplink frame may indicate that the uplink frame includes the MB-BQR.

In some embodiments, the AP 502 may transmit, to the STA 504, a frame that includes a physical (PHY) capabilities information field. In some embodiments, the AP 502 may encode the PHY capabilities information field to include a field that indicates whether the AP 502 supports exchange of the MB-BQRP and the MB-BQRs. In some embodiments, the AP 502 may receive a frame/message from the STA 504 (including but not limited to a PHY capabilities information field) that includes a field that indicates whether the AP 502 supports exchange of the MB-BQRP and the MB-BQRs. The AP 502 and/or STA 504 may use MB-BQRPs and/or MB-BQRs based on information included in those frames/messages (PHY capabilities information field and/or other).

In some embodiments, the AP 502 may transmit, to the STA 504, capability information configurable to indicate that the STA 504 is permitted to send unsolicited MB-BQRs. In some embodiments, the AP 502 may receive, uplink frames from the STA 504 that include the unsolicited MB-BQRs.

In some embodiments, the AP 502 may transmit the TF in a single frequency band of the plurality of frequency bands. In some embodiments, the AP 502 may receive the uplink frame from the STA 504 in a single frequency band of the plurality of frequency bands. In some embodiments, the STA 504 may transmit the uplink frame in a single frequency band of the plurality of frequency bands. In some embodiments, the same frequency band may be used by the AP 502 and STA 504 to exchange the TF/uplink frame. In some embodiments, the AP 502 and STA 504 may use different frequency bands to exchange the TF/uplink frame.

In some embodiments, the AP 502 may be configurable to operate in a plurality of frequency bands. In some embodiments, the AP 502 may select, from the plurality of frequency bands, select a subset of frequency bands for which the AP 502 is to request, from an STA 504, per-band buffer status reports (BSRs) that indicate per-band information related to data sizes to be sent by the STA 504. In some embodiments, the AP 502 may transmit a Trigger Frame (TF) for a multi-band BSR polling (MB-BSRP) to request the per-band BSRs. In some embodiments, the AP 502 may encode the TF to indicate the subset of frequency bands. In some embodiments, the AP 502 may receive, from the STA 504, an uplink frame that includes a multi-band BSR (MB-BSR) that indicates the per-band BSRs. In some embodiments, the AP 502 may determine, based on the MB-BSR, one or more of: one or more frequency bands of the subset of frequency bands; one or more corresponding channels; and/or other. The information may be determined for one or more of: an uplink transmission by the STA 504; a downlink transmission by the STA; and/or other.

In some embodiments, the AP 502 may encode the TF to include a TF type parameter. In some embodiments, the TF type parameter may be configurable to indicate that the TF is for the MB-BSRP. In some embodiments, the AP 502 may encode the TF to include a Trigger Dependent User Information subfield that includes a requesting bands parameter. In some embodiments, the AP 502 may encode the requesting bands parameter to indicate the subset of frequency bands. In some embodiments, the AP 502 may encode the TF for transmission in a single frequency band of the plurality of frequency bands.

In some embodiments, the AP 502 may receive the uplink frame from the STA in a single frequency band of the plurality of frequency bands. In some embodiments, the STA 504 may transmit the uplink frame in a single frequency band of the plurality of frequency bands. In some embodiments, the same frequency band may be used by the AP 502 and STA 504 to exchange the TF/uplink frame. In some embodiments, the AP 502 and STA 504 may use different frequency bands to exchange the TF/uplink frame.

In some embodiments, the STA 504 may be configurable for multi-band operation in a plurality of frequency bands. In some embodiments, each of the frequency bands may comprise one or more channels. In some embodiments, the STA 504 may transmit, to an AP 502, an uplink frame that includes a control field. In some embodiments, the STA 504 may transmit, to an AP 502, an uplink frame. In some embodiments, the STA 504 may encode the control field to indicate one or more operating mode (OM) changes at the STA 504. In some embodiments, the STA 504 may encode the control field to indicate a time duration after which the OM changes are to be in effect at the STA 504. In some embodiments, the STA 504 may encode an uplink frame for transmission after the indicated time duration and in accordance with the indicated OM changes. In some embodiments, the control field may be configurable to indicate per-band OM changes for one or more of the frequency bands.

In some embodiments, an apparatus of an AP 502 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

Figure 9:
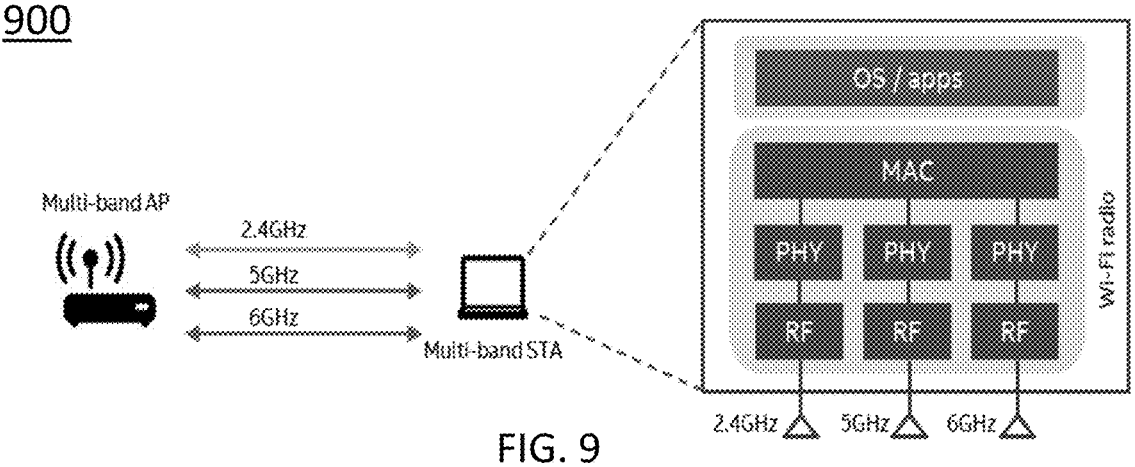
FIG. 9 illustrates example multi-band operation in accordance with some embodiments.
Figure 10:
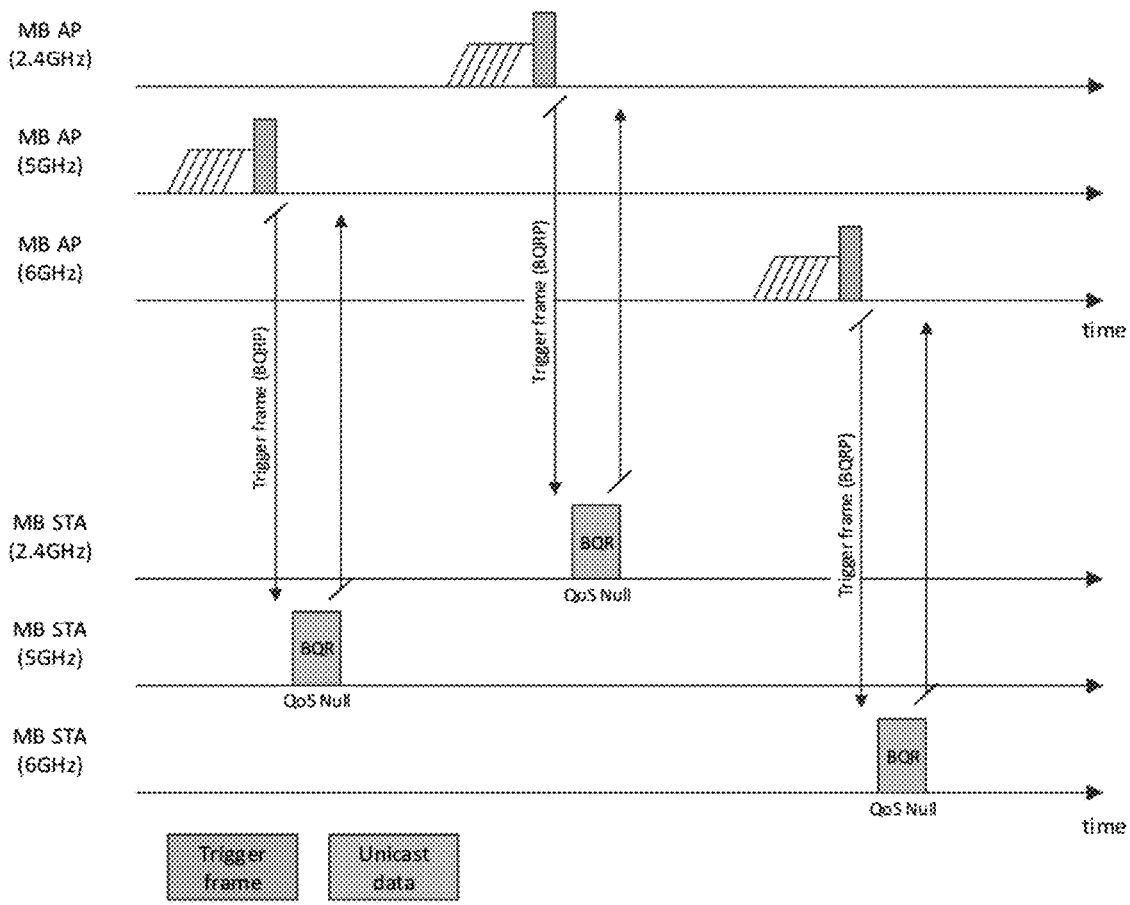
FIG. 10 illustrates example operations in accordance with some embodiments.
Figures 11, 12:
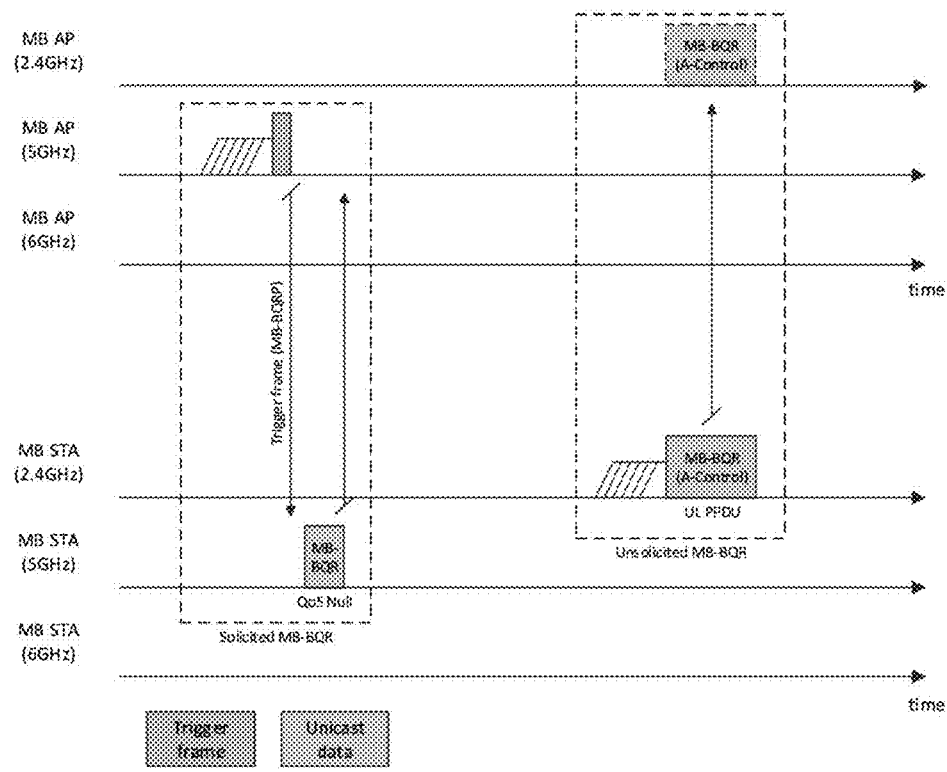
FIG. 11 illustrates example operations in accordance with some embodiments.
FIG. 12 illustrates an example element in accordance with some embodiments.
Figure 13:
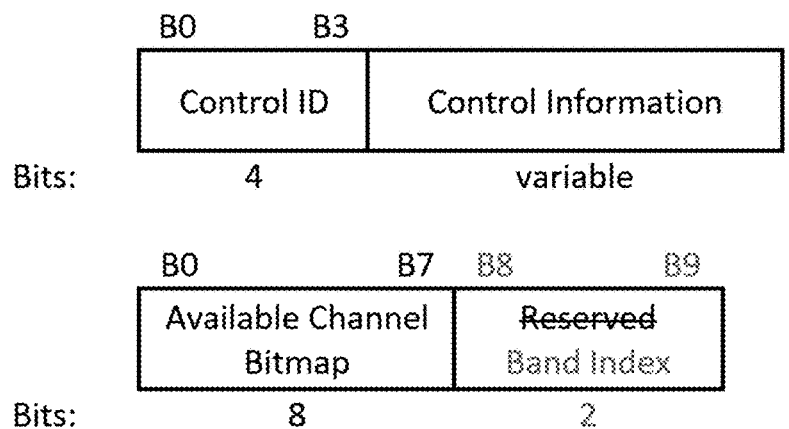
FIG. 13 illustrates example elements in accordance with some embodiments.
Figure 14:
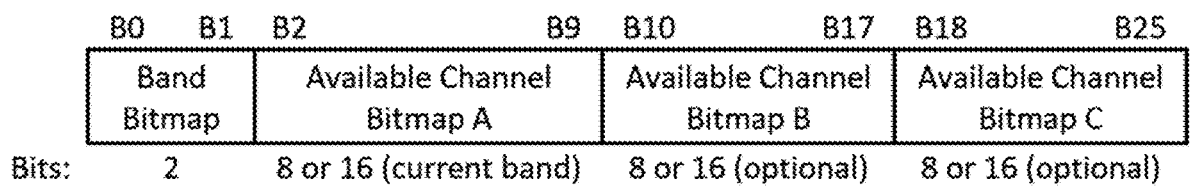
FIG. 14 illustrates an example element in accordance with some embodiments.
Figure 19:
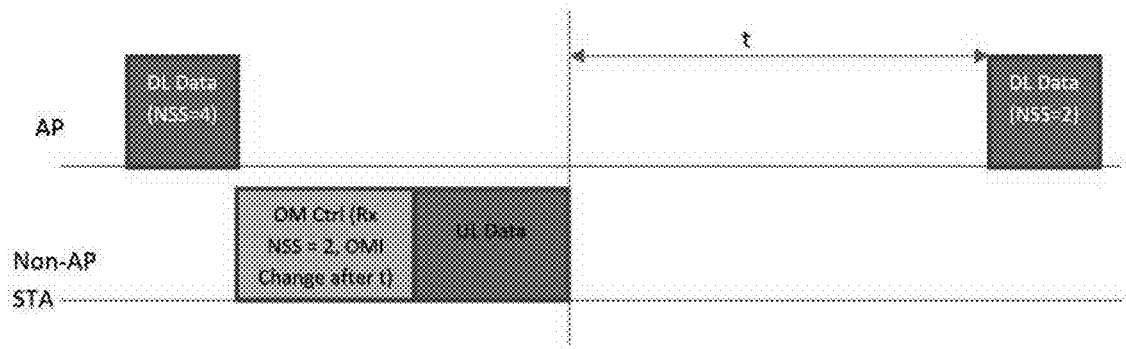
FIG. 19 illustrates example operations in accordance with some embodiments.
Figure 20:
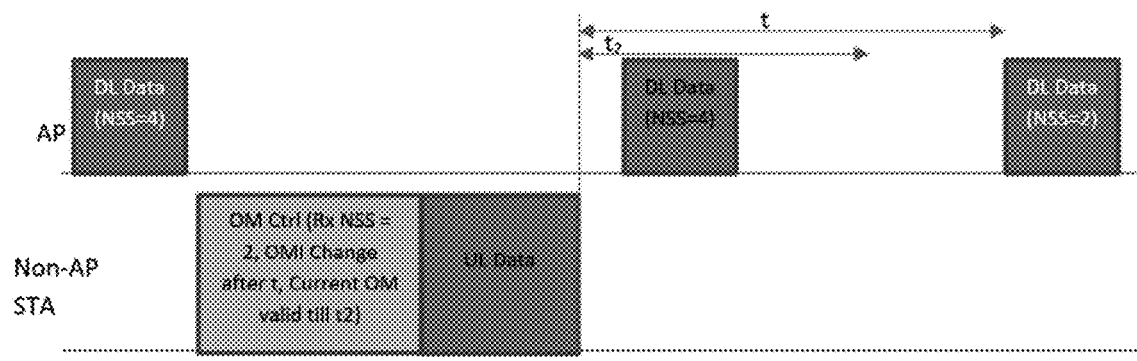
FIG. 20 illustrates example operations in accordance with some embodiments.
Figures 22, 23:
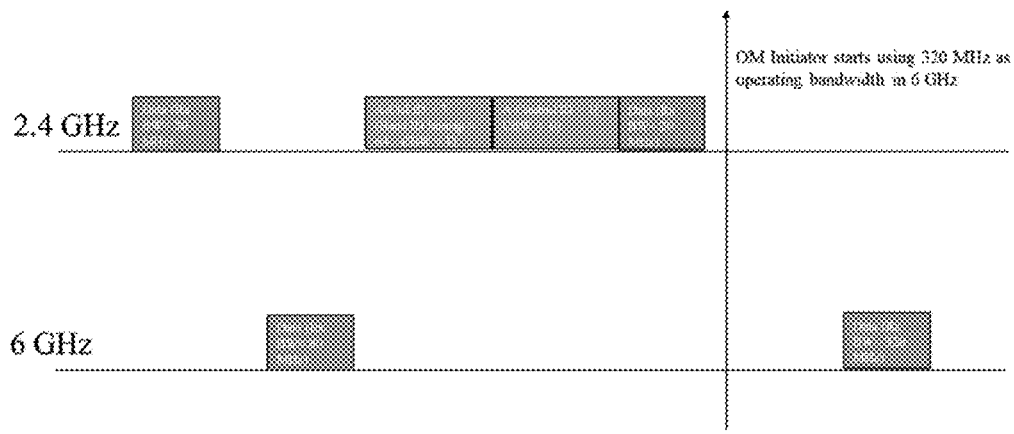
FIG. 22 illustrates example operations in accordance with some embodiments.
FIG. 23 illustrates example elements in accordance with some embodiments.
Figure 24:
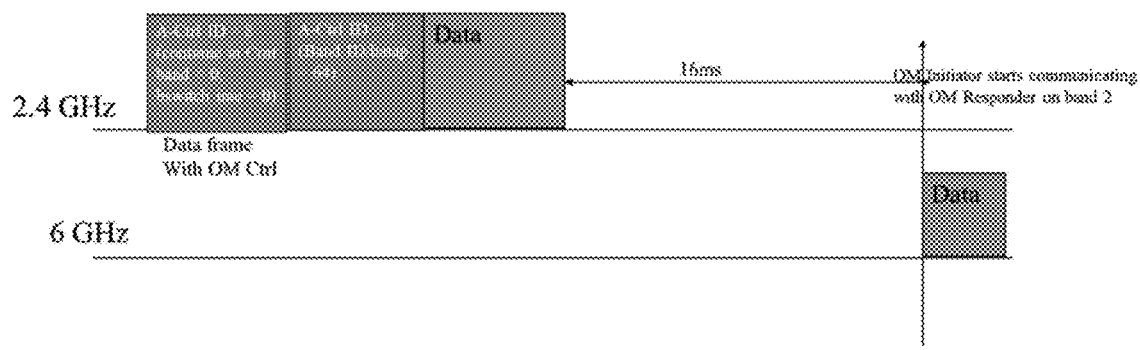
FIG. 24 illustrates example operations in accordance with some embodiments.

FIG. 9 illustrates example multi-band operation in accordance with some embodiments. FIG. 10 illustrates example operations in accordance with some embodiments. FIG. 11 illustrates example operations in accordance with some embodiments. FIG. 12 illustrates an example element in accordance with some embodiments. FIG. 13 illustrates example elements in accordance with some embodiments. FIG. 14 illustrates an example element in accordance with some embodiments. FIG. 15A illustrates example elements in accordance with some embodiments. FIG. 15B illustrates example elements in accordance with some embodiments. In descriptions herein, "FIG. 15" may include FIG. 15A and FIG. 15B. FIG. 16 illustrates example elements in accordance with some embodiments. FIG. 17 illustrates example elements in accordance with some embodiments. FIG. 18 illustrates example elements in accordance with some embodiments. FIG. 19 illustrates example operations in accordance with some embodiments. FIG. 20 illustrates example operations in accordance with some embodiments. FIG. 21 illustrates example elements in accordance with some embodiments. FIG. 22 illustrates example operations in accordance with some embodiments. FIG. 23 illustrates example elements in accordance with some embodiments. FIG. 24 illustrates example operations in accordance with some embodiments.

It should be noted that the examples shown in FIGS. 9-24 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-24. Although some of the elements shown in the examples of FIGS. 9-24 may be included in a WLAN standard, Wi-Fi standard, 802.11 standard, and/or other standard, embodiments are not limited to usage of such elements that are included in standards.

Some embodiments may be related to techniques, operations, and/or methods for enabling Bandwidth Query Report (BQR) for concurrent multi-band operation in next-gen Wi-Fi. Some embodiments may be related to concurrent multi-band (MB) operation for next-gen Wi-Fi, i.e., IEEE Extremely High Throughput (EHT). In some embodiments, APs 502 and/or STAs 504 may be multi-band-capable, and such MB STAs 504 can associate with MB APs 502 over multiple frequency bands (e.g., 2.4, 5, 6 GHz), as shown in FIG. 9. It should be noted that references to an MB STA 504, STA 504, MB AP 502, and/or AP 502 are not limiting. For instance, a technique, operation and/or method may be performed by one device (such as an MB STA 504, STA 504, MB AP 502, AP 502, and/or other device) in some descriptions herein. It is understood, however, that the same (and/or similar) technique, operation and/or method may be performed by another device (such as an MB STA 504, STA 504, MB AP 502, AP 502, and/or other device), in some embodiments.

In some embodiments, the MB STA 504 can exchange frames with the associated MB AP 502 on one or more supported frequency bands. The non-limiting example 900 in FIG. 9 illustrates an example multi-band Wi-Fi communication scenario in which a multi-band (MB) STA 504 is associated with multi-band-capable AP 502 over multiple frequency bands. The non-limiting example in FIG. 9 uses three frequency bands (2.4, 5, and 6 GHz), but embodiments are not limited by this example (in term of the particular frequency bands shown, the number of frequency bands shown and/or other aspects).

In some embodiments, the current 802.11ax spec introduces mechanisms to enable APs 502 to request the Bandwidth Query Report (BQR) from HE STAs 504, so that the STAs 504 can inform the list of available channels at the STA 504 to the associated AP 502. Then, the AP 502 can use such information for resource allocation, scheduling, etc. The STAs 504 can also report BQR voluntarily using the A-Control field in their UL PPDU transmissions (Implicit BQR operation).

In some cases, a single-band (or per-band) BQR mechanism may not be sufficient for multi-band operation which is expected in the next-gen Wi-Fi (IEEE EHT). For instance, one or more of the following may be applicable in some cases: 1) latency in BQR update: for delivering Implicit BQRs, an MB STA 504 may need to wait until the target channel becomes available or until it has some data to transmit on that channel, which will incur additional latency in sending BQR to the MB AP 502; 2) additional MAC overhead, as the MB AP 502 and STA 504 may need to exchange additional management (or action) frames (e.g., Trigger frame and QoS Null frame) per-band, causing additional MAC overhead and increase in power consumption; and/or 3) other. In the non-limiting example 1000 in FIG. 10, example behavior of Trigger-based (solicited) BQR per-band in multi-band Wi-Fi communication scenarios is shown.

Some embodiments may be related to technique, operations and/or methods to enable concurrent multi-band-capable STAs 504 to report/piggyback channel availability of the other frequency bands in a single uplink frame. In a BQR mechanism for 802.11ax, one or more of the following may be performed: a Bandwidth Query Report (BQR) mechanism to allow APs 502 to solicit channel availability information from its associated STAs by sending a Trigger frame with BQRP type; the STAs 504 can also voluntarily report channel availability using A-Control field by including BQR Control subfield; and/or other. The BQR mechanism in 802.11ax assumes single-band operation. Using the 802.11ax BQR mechanism in concurrent multi-band operation may not be desirable, in some cases, since it is not fully leveraging the presence of multiple frequency bands and opportunity to consolidate/piggyback BQR for multiple bands in a single frame transmission.

In some embodiments, MB APs 502 and MB STAs 504 may share channel availability information in a more efficient manner by allowing MB STAs 504 to piggyback channel availability information of other operating bands in a single frame transmission instead of sending (or exchanging) separate frames per band. It can be done by extending the current 802.11ax Bandwidth Query Report (BQR) mechanism for both solicited and unsolicited scenarios. For example, a MB AP 502 can solicit MB-BQR(s) from its associated MB STA(s) 504 by sending a new type of trigger frame (called MB-BQR Poll). Or MB STA(s) 504 can voluntarily report channel availability of multiple bands by sending a MB-BQR Control Information in A-Control field of uplink PPDU transmission.

In some embodiments, a proposed MB-BQR procedure may enable MB STAs 504 to consolidate the channel availability information of multiple operating bands and convey them in a single frame on one of the supported frequency bands. Such a solution may have one or more of the following advantages: 1) MB STAs 504 can opportunistically send MB-BQRs for other bands in their uplink PPDU transmissions, thus enabling MB STAs 504 to use spectrum resources more efficiently and help MB APs 502 to better schedule downlink/uplink transmissions; 2) MAC overhead may be reduced in comparison to the current per-band BQR mechanism; and/or 3) other.

Some embodiments (which may be referred to for clarity as "option 1") may be related to a solicited MB-BQR. The MB AP 502 may solicit MB-BQRs from one or more MB STAs 504 which support generating MB-BQR, by sending a MB-BQR Trigger frame. Non-AP STAs 504 which support generating a MB-BQR respond to the trigger frame with QoS Null (or QoS Data) frame with MB-BQR in the A-Control field.

Some embodiments (which may be referred to for clarity as "option 2") may be related to an unsolicited MB-BQR. The MB STA 504 may report the channel availability information for target band(s) in the MB-BQR Control subfield of frames it transmits, if the MB AP 502 has indicated its support in the "MB-BQR Support" subfield of is EHT Capabilities element. The non-limiting example 1100 in FIG. 11 illustrates example behaviors of the proposed solicited and unsolicited MB-BQR mechanisms in concurrent multi-band Wi-Fi operation.

Some embodiments may be related to a proposed MB-BQR Trigger frame format. As discussed above, MB-BQR can be solicited by the MB AP 502 that the STA 504 is associated with. To enable trigger-based MB-BQR, a new Trigger type is proposed, called MB-BQR Poll (MB-BQRP), as shown in the example table below. Embodiments are not limited to the names and/or values shown in the example table below.

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Multi-band Bandwidth Query Report Poll (MB-BQRP) |
| 9-15 | Reserved |

In some embodiments, the MB AP 502 may indicate the target bands for the BQR in the User Info field (although the scope of embodiments is not limited to this field). A 4-bit "Target Band Bitmap" subfield (embodiments are not limited to this name, type and/or size) may be used in the Trigger Dependent User Info subfield of the User Info field, as shown in FIG. 12.

In some embodiments, the "Target Band Bitmap" subfield can be a 3-bit subfield (embodiments are not limited to this name, type and/or size) indicating the target band(s) for MB-BQR from the STA 504. For example, if a MB STA supports 2.4, 5 and 6 GHz bands, then a non-limiting example encoding for the "Target Band Bitmap" is shown in the table below. Other mappings may be used, in some embodiments. The table below illustrates an example encoding rule for the proposed "Target Band Bitmap" subfield in Trigger Dependent User Info field of the MB-BQRP Trigger frame.

| Target Band Bitmap Index | Meaning |
|---|---|
| 0 | First lowest frequency band among supported band(s) (2.4 GHz) |
| 1 | Second lowest frequency band among supported band(s) (5 GHz) |
| 2 | Third lowest frequency band among supported band(s) (6 GHz) |
| 3 | N/A |

Some embodiments relate to an MB-BQR Control frame format. In some embodiments, a BQR Control field may be extended. A current 802.11ax BQR Control frame (i.e., Control ID 5) can be extended to indicate BQR for specific frequency band (e.g., other than the current band where the frame is transmitted). In FIG. 13, 1300 illustrates the 802.11ax Control subfield format. In FIG. 13, 1350 illustrates a proposed Control Information subfield for Bandwidth Query Report (BQR) Control type (i.e., Control ID 5). Note that the IEEE EHT may define 320 MHz channel bandwidth in 6 GHz band, and in that case, the unit of channel bandwidth in 6 GHz can be 40 MHz instead of 20 MHz.

In a non-limiting example, the 802.11ax BQR subfield consists of 8-bit "Available Channel Bitmap" subfield (embodiments are not limited to this name, type and/or size) to indicate channel availability per 20 MHz channel and 2-bit "Reserved" subfield.

In some embodiments, a new "Band Index (B8-B9)" subfield can be defined by repurposing the 2-bit "Reserved" subfield to indicate the target frequency band of the "Available Channel Bitmap (B0-B7)" subfield (embodiments are not limited to these names, types and/or sizes). In the current frame format, the value of "Available Channel Bitmap" always indicates the channel availability of the current operating band where the current frame is transmitted. Due to the "Band Index" subfield, the STA 504 can report the channel availability of other frequency bands. For example, if a STA 504 wants to report the channel availability of two bands (e.g., 2.4 and 5 GHz), then it can include two BQR Control subfields in the A-Control field.

The table below shows an example encoding rule for the "Band Index" subfield in BQR Control field. For example, if the STA 504 supports 2.4, 5 and 6 GHz bands, then the "Band Index" values of 0, 1 and 2 represents frequency bands 2.4, 5 and 6 GHz, respectively. Embodiments are not limited to the mapping shown or the number of band index values shown.

| Band Index value | Meaning |
|---|---|
| 0 | Current operating band in which this frame is received |
| 1 | First lowest frequency band among supported band(s) |
| 2 | Second lowest frequency band among supported band(s) |
| 3 | Third lowest frequency band among supported band(s) |

In some embodiments, a Multi-band BQR Control field may be used. Another way to enable multi-band BQR is to define a new Control type called "Multi-band Bandwidth Query Report" (MB-BQR) to allow EHT STAs to report the channel availabilities of multiple operating frequency bands (e.g., 2.4, 5 and 6 GHz bands) with a single frame transmission instead of sending separate frames for BQR per-band. A Control ID value (e.g., 7) can be allocated to indicate MB-BQR, as shown in the table below.

| Control ID value | Meaning | Length of the Control Information subfield (bits) |
|---|---|---|
| 0 | Triggered response scheduling (TRS) | 26 |
| 1 | Operation mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7 | Multi-band BQR | TBD |
| 8-15 | Reserved | |

FIG. 14 illustrates a proposed frame format 1400 of the MB-BQR Control subfield. In a non-limiting example, the size of the MB-BQR Control is 26 bits, which is maximum allowed for A-Control field. Embodiments are not limited to this size.

In a non-limiting example, the MB-BQR Control field may have one or more of the following subfields (embodiments are not limited to the sizes, names or other aspects given below). In some embodiments, a Band Bitmap (of 2 bits or other size) may indicate the target frequency bands for the following "Available Channel Bitmap" subfield(s). In some embodiments, an available Channel Bitmap (of 8 bits or 16 bits or other size) may indicate channel availability of 20 MHz or 40 MHz) channels per band indicated in the "Band Bitmap" subfield. In a non-limiting example, the STA 504 may include up to 3 "Available Channel Bitmap" subfields (embodiments are not limited to this number). In a non-limiting example, the size of the subfield can be either 8 bit each bit indicating 20 MHz channel for 2.4 and 5 GHz and 40 MHz for 6 GHz band (embodiments are not limited to these numbers). In a non-limiting example, if the MB-BQR control field is newly defined in EHT without 30 bit size constraint, the size of the channel bitmap subfield can be 16 bits to cover 320 MHz bandwidth (embodiments are not limited to these numbers).

The table below shows a non-limiting example encoding for the "Band Bitmap" subfield in the MB-BQR Control field (embodiments are not limited to the mapping shown, the cases shown or to the number of cases shown).

| Band Bitmap | Meaning |
|---|---|
| 00 | 1 Available Channel Bitmap subfield corresponding to current operating band in which this frame is received. |
| 01 | 2 Available Channel Bitmap subfields corresponding to current operating band in which this frame is received and the $2^{nd}$ lowest frequency band excluding the current band. |
| 10 | 2 Available Channel Bitmap subfields corresponding to current operating band in which this frame is received and the $1^{st}$ lowest frequency band excluding the current band. |
| 11 | 3 Available Channel Bitmap subfields corresponding to 3 operating bands. |

In a non-limiting example, one or more of the following may be used. 1) If the STA 504 only reports the channel availability of the current band in which the frame is transmitted, then the STA 504 may set the "Band Bitmap" subfield to "00" and include one "Available Channel Bitmap" subfield. 2) If the STA 504 is sending a frame on 2.4 GHz band to report the channel availability of three frequency bands, i.e., 2.4 and 5 GHz, then it sets the "Band Bitmap" subfield to "10" and the first and second "Available Channel Bitmap" subfields indicate the channel availability of 2.4 and 5 GHz bands, respectively. 3) If the STA 504 is sending a frame on 5 GHz band to report the channel availability of three frequency bands, i.e., 2.4, 5 and 6 GHz, then it sets the "Band Bitmap" subfield to "11" and the first, second and third "Available Channel Bitmap" subfields indicate the channel availability of 5, 2.4 and 6 GHz bands, respectively.

Some embodiments may be related to a physical (PHY) capabilities information field. In some embodiments, MB APs 502 and/or STAs 504 may be able to indicate whether they support MB BQR capability in Probe Request/Response frames. In some embodiments, a 1-bit "MB BQR Support" field in PHY Capabilities Information field may be used (embodiments are not limited to this name, type and/or size).

In FIG. 15, 1500 illustrates a non-limiting example related to the HE PHY Capabilities Information field.

Some embodiments may be related to enhanced buffer status indication for multi-band TWT (Target Wake Time) operations. Some embodiments may be related to multi-band operation, including but not limited to multi-band operation in next-gen Wi-Fi. In some embodiments, concurrent multi-band (MB) operations may be used in the next generation 802.11 standard (EHT, Extremely High Throughput), which may consist of two main types. The first type is similar to channel bonding wherein multi-band STAs 504 transmit or receive a single PPDU on non-contiguous channels spread across multiple bands (e.g., layer-1 aggregation). The other type may allow somewhat independent operation wherein STAs 504 in each band can transmit or receive a PPDU only within that band regardless of the transmissions in the other bands (e.g., layer-2 aggregation). Some embodiments may be related to concurrent multi-band operation in EHT wherein multi-band-capable APs 502 and STAs 504 can operate on multiple bands (e.g., 2.4, 5 and 6 GHz). In some embodiments, the existing 802.11 power save mechanisms, including TWT (Target Wake Time) may not be suitable for multi-band operation, and their design may need to be revisited.

In some embodiments, in the current flax spec, in each Trigger enabled TWT SP (service period), an AP 502 is required to schedule a Trigger frame transmission to the TWT Requesting STA 504. Moreover, the AP 502 is also recommended in such SPs to solicit buffer status reports (BSRs) from that STA 504. However, in concurrent multi-band operations, a multi-band (MB) STA 504 may want to signal an AP 502 on how much data it prefers to transmit per operating frequency band rather than an aggregate BSR across all bands in one or more scenarios, including but not limited to: 1) the STA 504 may only want to operate on a subset of bands for power savings, for example, since it has only a small amount of data which is not sufficient to justify operating on all of the supported bands; 2) the TX queue implementation at the STA 504 does not allow for transmission of packets queued for a particular band to be transmitted on a different band; and/or 3) other.

Some embodiments may be related to a mechanism for the STA 504 to signal its per-band BSR to the AP 502. In some embodiments, band specific information may be added to the buffer status reports (BSRs) sent by each STA 504 that signal the amount of data that the STA 504 has (or wishes to transmit) on a particular band.

In some cases, the AP 502 can utilize the information sent by the STA 504 to decide a particular band(s) that the STA 504 can use to transmit uplink (UL) packets in a power efficient manner.

In some embodiments, an enhanced BSRP (Buffer Status Report Poll) Trigger frame type (called Multi-band BSRP) sent by the AP 502 contains information for which bands the AP 502 wants to receive BSR information. In some embodiments, the STA 504 can use the existing QoS Control field(s) inside QoS Null or QoS Data frames to signal queue size for other operating band (other than the band in which the frame was received), and indicate the corresponding band information in a new A-Control field. Note that there are not enough "Reserved" fields in the QoS Control field that allows signaling of band information. For example, if the STA 504 is reporting the queue size of 5 GHz band in QoS Control field of a frame transmitted on 2.4 GHz band, then it will indicate the band information in a new A-Control field. In some embodiments, the STA 504 can also use a new A-Control field (called multi-band BSR Control) to indicate the queue size of multiple bands. In some embodiments, the STA 504 can use one or more of the above for the HE (or EHT) TB PPDU sent in response to the Trigger frame from the AP 502.

Some embodiments are related to a proposed multi-band BSRP Trigger frame. In some embodiments, the Trigger variant can be indicated by one or more of the following approaches. The table below illustrates an example Trigger Type subfield encoding to signal multiband BSRP TF.

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | BQRP |
| 7 | NDP Feedback Report Poll (NFRP) |
| 8 | Multi-band BSRP |
| 9-15 | Reserved |

One or more of the following may be used: one reserved field in the Common Info field (e.g., Bit 63); one or more bits in the Trigger Dependent Common Info subfield; a combination of Trigger Type and Trigger Dependent Common Info subfields (the table below and FIG. 16). The table below illustrates an example Trigger Type subfield encoding to signal multiband TF. In FIG. 16, 1600 illustrates an example Trigger Dependent Common Info field for Multi-band BSRP Trigger frame variant.

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | BQRP |
| 7 | NDP Feedback Report Poll (NFRP) |
| 8 | Multi-band |
| 9-15 | Reserved |

The table below illustrates an example encoding for the Trigger Subtype subfield.

| Trigger Subtype subfield value | Trigger frame variant |
| --- | --- |
| 1 | BSRP |
| 0 | Reserved |

In some embodiments, the AP 502 can signal which bands it is soliciting BSR from a particular STA 504 by encoding a Trigger Dependent User Info field in the User Info field corresponding to that STA 504. An example 1630 in FIG. 16 illustrates an example Trigger Dependent User Info field for Multiband BSRP Trigger frame variant.

In some embodiments, the "Requesting Bands (B0-B2)" subfield may contain either a bitmap or an absolute value encoding that uniquely specifies which of the three bands (assuming a maximum of 3 bands per STA 504) the AP 502 is requesting BSRP information for. In some embodiments, the AP 502 can also use the Trigger frame to signal the bands which it will use to transmit downlink (DL) packets or solicit UL packets in this TWT SP. For example, the AP 502 can use one of the "Reserved (B3-B7)" bits in the Trigger Dependent User Info field in 1630 in FIG. 16 to signal that it intends to use the bands indicated in the Requesting Bands subfield for upcoming DL and UL transmissions in the TWT SP.

Some embodiments may be related to proposed methods of using QoS Control (and A-Control for band indication) to report queue size of other band. If the STA 504 uses the QoS Control field(s) inside QoS Null frames to signal queue size for each TID (Traffic Identifier) corresponding to a particular band, then it shall include an A-Control field to identify the band associated with this queue size information which can be designed as below. In some embodiments, a new Control subfield variant of the A-Control subfield may be used, as in the table below. The table below illustrates example Control ID subfield values.

| Control ID value | Meaning | Length of the Control Information subfield (bits) | Content of the Control Information subfield |
| --- | --- | --- | --- |
| 7 | Multi-band index | 26 | |
| 8-15 | Reserved | | |

In some embodiments, the Control Information subfield of the new A-Control subfield variant can be designed as below. In FIG. 16, 1660 illustrates an example Control Information subfield for multi-band BSR Control variant with Control ID value 7.

In some embodiments, each of the bits B0-B3 indicate a particular band for which the corresponding data is signaled in the QoS Control field of the containing QoS Null frame. The bit B4 may be used to signal if the data is across all bands. In some embodiments, one or more of the "Reserved (B5-B25)" bits in the A-Control subfield in 1660 in FIG. 16 can be used to signal for which particular AC the STA 504 prefers to transmit data in this band. For example, those "Reserved" bits may contain fields similar to ACI High, Scaling Factor and Queue Size High subfields (in the Control Information subfield for 11ax BSR Control) that together indicate the preferred AC. In some embodiments, the STA 504 may use one or more bits in the A-Control subfield variant for multiband BSR Control to signal its unavailability in bands for which it has indicated no UL data in the Queue Size subfields.

Some embodiments may be related to proposed methods of using a new A-Control field (called multi-band BSR) to report queue size(s) of other band(s). In some embodiments, if the STA 504 uses the A-Control field to signal multi-band BSRs, then it may use a new variant of the A-Control field as below. In some embodiments, a new Control subfield variant of the A-Control subfield may be used, an example of which is shown in the table below. The table illustrates example control ID subfield values.

| Control ID value | Meaning | Length of the Control Information subfield (bits) | Content of the Control Information subfield |
|---|---|---|---|
| 7 | Multi-band index | 26 | |
| 8 | Multi-band BSR Control | 26 | |
| 9-15 | | | |

In some embodiments, the design of the Control Information subfield for multiband BSR Control can be a modified version of the subfield for BSR Control as shown in 1680 in FIG. 16. In FIG. 16, 1680 illustrates an example Control Information subfield for multi-band BSR Control variant with Control ID value 8.

In some embodiments, the values of ACI Bitmap, Delta TID, ACI High, Scaling Factor and Queue Size All subfields may be the same as in 11ax BSR Control. The "Multi-band index" subfield may include either a bitmap or encoding representing the particular band for which the Queue Size All subfield is indicated. A particular value of the "Multi-band index" subfield can indicate that the Queue Size All subfield represents queue size across all bands and all TIDs as reported in the ACI Bitmap and Delta TID subfields.

In some embodiments, the Control Information subfield for multi-band BSR Control can be designed to include (TID, queue size) for multiple bands, as described below. The idea is to report information in a format, which is more consistent with the information provided in the QoS Control field and allow the AP 502 to combine the information from the QoS Control and A-Control fields to maintain a single (band, TID, queue size) database.

In some embodiments, a "Multi-band Info Bitmap" subfield identifies the bands whose queue size information is contained in the A-Control field; the queue size information for the current band of operation may be contained in the QoS Control field. The encoding of this subfield is shown in the table below. The table below illustrates an example Multiband Info Bitmap subfield encoding.

| Multiband Info Bitmap subfield value | Interpretation |
|---|---|
| 01 | The A-Control field only contains the queue size information for the 2$^{nd}$ highest band the STA operates on (out of the two possible bands excluding the current band of operation) |
| 10 | The A-Control field only contains the queue size information for the highest band the STA operates on (out of the two possible bands excluding the current band of operation) |
| 11 | The A-Control field contains the queue size information for the two other bands the STA operates on (excluding the current band of operation if operating on three different bands) |
| 00 | The A-Control field contains the queue size information for all bands the STA operates on including the current band. (For example, this can be used when a STA is currently operating on two or more bands and reporting BSRs for all bands.) |

In FIGS. 17, 1700 and 1720 illustrate an example frame format for the A-Control field for different Multiband Info Bitmap. In FIG. 17, 1700 illustrates an example Control Information subfield for Multi-band BSR Control variant with Control ID value 7 and Multi-band Info Bitmap field value 11. In FIG. 17, 1720 illustrates an example Control Information subfield for Multi-band BSR Control variant with Control ID value 7 and Multi-band Info Bitmap field value 01 or 10.

In some embodiments, the "Reserved" fields may be used to signal additional information, for example, as shown in 1740 in FIG. 17. In 1740, the SubControl ID field identifies the content of the bits B18-B25. For example, the value of SubControl ID subfield may be equal to 4 identifying the bits B18-B25 as the Content of the Control Information subfield for UL Power Headroom A-Control field. In FIG. 17, 1740 illustrates an example Control Information subfield for multiband BSR Control variant with Control ID value 7 and Multi-band Info Bitmap field value 01 or 10 and bits 14-25 used to contain UL Power Headroom information.

Some embodiments may be related to a mechanism to enhance OM Control field for EHT. In some cases, the 802.11ax amendment allows HE non-AP STAs to dynamically inform the HE AP STAs (and vice versa) of Operating Mode (OM) changes such as: the operating channel width, maximum number of spatial streams for packet reception, maximum number of space-time streams for packet transmission, whether or not UL MU frame transmission between the AP and STA is disabled or not, and/or other. The AP 502 and STA 504 signals these changes by using a new A-Control field variant, called OM Control, that can be included with a QoS Data, NULL or Class 3 Management frame. The STA 504 transmitting the OM Control field is called an OMI Initiator while the intended recipient for the frame containing this OM Control field is called an OMI Responder.

In some cases, the OMI mechanism faces a timing constraint regarding activation of the links. Essentially, the OMI Initiator might need additional time, even after transmitting the frame containing the OM Control field, before the changes signaled in the OM Control field actually takes into effect. However, since the OM Responder does not know the exact time when those changes take into effect it might transmit frames to the OMI Initiator with the new OM parameters even before the latter has actually implemented the above changes. As a result this can cause packet losses at the link between those two STAs 504. Moreover, an OMI Responder AP 502 may take some time to process a frame with OM Control field that has UL MU Data Disable subfield set to 1 and stop the uplink transmission. During this time the AP 502 may send the STA 504 TFs soliciting TB PPDUs thereby leading to medium inefficiency. Another issue with the OM Control field is that it has been designed for single band operation. However, multiband operation is a very likely feature in EHT in which case band of operation also becomes a operating mode parameter. One or more of the following may be applicable: how to signal the OM parameters for other bands with a frame transmission in current band; how to signal a change of operating bands with a single QoS NULL or Data frame; and/or other. Some embodiments may be related to how the OM scheme can be extended to address the above 2 problems in EHT.

In some cases, the 11ax spec mentions one way to resolve the problem of timing constraints in OMI by using the Power Management subfield in the Frame Control field to indicate the time till which a non-AP STA is unable to receive frames. Essentially the Operating Mode Initiator sets the subfield to 1 in the frame that contains the OM Control field thereby signaling to the AP that it is going to power save mode. The non-AP STA sets this bit to 1 in a subsequent QoS Null frame signaling that it is ready to receive frames with the new Operating Mode. In some cases, an extra medium (and possibly scheduling) overhead of transmitting a QoS Null frame may be present.

In some embodiments, one or more of the following may be used: a) explicitly informing the OMI Responder about the maximal time by which the Operating Mode changes is implemented at the OMI Initiator; b) adding additional fields to signal behavior for multiple bands; c) other.

In some embodiments, one or more of the techniques, operations and/or methods may enable the OMI Responder to unambiguously know about the time at which the OM changes is implemented thereby resulting in medium efficiency, lesser computational overhead at the OMI Responder to track the OM changes of the OMI Initiator (e.g., by not allocating resources for the latter to receive QoS Null frames in HE TB PPDUs as might be needed in the solution in 3.2) and better latency performance. In some embodiments, the OMI scheme may be extended to more than one band.

In some embodiments, the OMI Responder and Initiator has explicit knowledge about the time by which the OM changes take into effect either from frames exchanged during association or during the transmission of the frame containing the OM Control field. In some embodiments, a new A-Control field variant that signals OM parameters for other bands may be used. In some embodiments, a new A-Control field variant that signals band/channel switch may be used.

In some embodiments, the OMI Initiator signals the time by which it will be ready for the OM change during association. In some embodiments, the time may be signaled in a new field inside the HE MAC Capabilities element. In some embodiments, the time may be signaled in a new field or using one or more of the Reserved bits in the HE Operation element. In some embodiments, the time may be signaled in an entirely new element or field carried in the Association Request frame or some other frame. In some embodiments, the OMI Initiator signals this time using a new subfield in the OM Control field. In FIG. 18, 1800 shows an example frame format for the OM Control field with this new subfield. In FIG. 18, 1800 shows an example of modified OM Control field containing a new subfield signaling time required to implement the OM change.

In some embodiments, the time may represent an absolute time when the OM Change takes into effect. In some embodiments, the time may represent an offset from the time at which the OM Control field is transmitted. In some embodiments, the time by which the OMI Initiator will be ready for the OM change may be expressed linearly in units of T milliseconds (where T can be 1 or more). For example, using the frame format in 1800 in FIG. 18 and T as 1 ms the OMI Initiator can signal a time offset up to ~16.4 s. In some embodiments, the OMI Initiator may signal a time till which the current OM remains in effect and/or the time by which the new OM parameters take into effect. In FIG. 18, 1820 shows an example of a frame format containing both these parameters. In FIG. 18, 1820 illustrates an example of modified OM Control field containing a new subfield signaling time required to implement the OM change as well as the time till which the current OM parameters are valid.

In some embodiments, a new OM Control field may be defined to contain additional fields signaling change of some parameters in other bands an example of which is shown for Rx NSS in 1840 in FIG. 18. In FIG. 18, 1840 illustrates an example OM Control field containing a NSS per Band sub-field. In FIG. 18, 1860 illustrates an example format of NSS per Band sub-field. In FIG. 18, 1860 illustrates an example of new OM Control field containing a new subfield that contains the list of active bands as well as the number of Rx spatial streams in each band (not including the current band of operation).

In some embodiments, the Rx NSS subfield in the NSS per Band field indicates whether the latter subfield indicates Rx NSS in each band or Tx NSS in each band. When set to 0, the subfield represents Tx NSS information in each band. When set to 1, the subfield represents Rx NSS information in each band. The values 2 and 3 are Reserved. The NSS in Band n (where n is an integer in the range of 1 to 5) subfield represents Rx or Tx NSS in the n-th lowest band in which the sender of the OM Control field is operating, not including the band in which the OM Control field is sent. Note that the set of all possible operating bands is assumed to be the following: 2.4 GHz band, lower 5 GHz band, upper 5 GHz band, lower 6 GHz, middle 6 GHz and upper 6 GHz bands. For example, if the sender of the OM Control field wants to operate using 1 Rx NSS in the 2.4 GHz band, 2 in upper 5 GHz band and 1 in middle 6 GHz band and the OM Control field is sent in the 5 GHz band then it uses the following configuration: the Rx NSS subfield in OM Control field is set as 2, the Rx NSS subfield in the NSS per Band subfield is set as 1, the NSS in Band 1 subfield is set as 1, NSS in Band 4 is set as 1; other subfields in the NSS per Band subfield are set as 0.

In some embodiments, the EHT MAC Capabilities for the device includes a field signaling the device's capability to dynamically switch operating bands.

FIG. 19 illustrates an example usage of the time information in the OM Control field by an AP 502 to resume transmission to the non-AP STA with the changed OM parameters. FIG. 19 illustrates example usage of the timing information in the OM Control field by an AP to transmit frames to a non-AP STA with valid OM parameters.

FIG. 20 shows an example usage of the time information in the OM Control field by an AP 502 to resume transmission to the non-AP STA with the changed OM parameters while continuing using the current OM parameters for some time after receiving the OM Control field. FIG. 20 illustrates example usage of the timing information in the OM Control field by an AP 502 to transmit frames to a non-AP STA with valid OM parameters (after the OM change is implemented as well as before).

In some embodiments, the A-Control field may include new parameters corresponding to multi-band operation (e.g., band switch time). In some embodiments, the new A-Control field may change the sizes of existing subfields from 11ax OM Control field. For example, the size of the Rx NSS, Tx NSS can be increased from 3 to 4 to cover up to 16 spatial streams case, the size of Channel Width subfield may be increased from 2 to 3 to cover 320 MHz operation.

In some embodiments, a new field representing the band index associated with a set of OM parameters is included with an enhanced OM Control field. This field may be the same as the Band ID field in 11ax or a bitmap. An example of format for the new A-Control field variant is shown in FIG. 21. FIG. 21 illustrates an example format of the Control Information subfield of A-Control field indicating OM parameters for a particular band.

In some embodiments, the new A-Control field variant contains the band index as well as some new or existing fields. The new A-Control field variant may be used alongside the flax A-Control field variants to signal the overall value of the OM parameters for a particular band. An example of format of such a A-Control field variant is shown in the table below and in FIG. 21. FIG. 21 illustrates an example format of A-Control field variant representing band index as well as partial information about some OM parameters.

FIG. 22 shows an example of how the A-Control field variant in FIG. 21 may be used alongside the 11ax OM Control field to signal OM parameters for a particular band.

In some embodiments, the A-Control field variant may contain subfields representing time to switch band or channel. In some embodiments, the A-Control field variant may contain subfields representing the TID(s) that are moved from one band to another. In some embodiments, the A-Control field variant may contain subfields representing whether operation in current band is suspended or not.

An example of format of such an A-Control field variant is shown in FIG. 23. In FIG. 23, the TID transferred subfield represents the index of TID(s) transferred to another band if not all TIDs in the current band are transferred to the other band. For example, the bit B0 in the subfield when set to 1, the other 3 bits represent the transferred TID index; when the bit B0 is set to 0 it represents that all TIDs currently in operation in current band are transferred to the other band.

FIG. 24 illustrates an example of how the A-Control field variant in FIG. 23 may be used alongside the A-Control field variant in FIG. 22 to signal a band switch.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) configurable for multi-band operation in a plurality of frequency bands, wherein each of the frequency bands comprises one or more channels, wherein the apparatus comprises: memory; and processing circuitry, configured to:
   from the plurality of frequency bands, select a subset of frequency bands for which the AP is to request per-band channel availability information from a station (STA);
   encode, for transmission, a Trigger Frame (TF) for a multi-band bandwidth query report polling (MB-BQRP) to request the per-band channel availability information,
   wherein the processing circuitry is further configured to encode the TF to indicate the subset of frequency bands;
   decode, from the STA, an uplink frame that includes a multi-band bandwidth query report (MB-BQR) that indicates the per-band channel availability information; and
   determine, based on the MB-BQR, for an uplink transmission by the STA:
   one or more frequency bands of the subset of frequency bands, and
   one or more corresponding channels.

2. The apparatus according to claim 1, the processing circuitry further configured to encode the TF to include a TF type parameter, wherein the TF type parameter is configurable to indicate that the TF is for the MB-BQRP.

3. The apparatus according to claim 1, the processing circuitry further configured to:
   encode the TF to include a Trigger Dependent User Information subfield that includes a target band bitmap parameter; and encode the target band bitmap parameter to indicate the subset of frequency bands.

4. The apparatus according to claim 1, wherein:
   the uplink frame is a quality-of-service (QoS) null frame or a QoS data frame, and
   the MB-BQR is included in a control-A field of the uplink frame.

5. The apparatus according to claim 1, wherein:
   the MB-BQR includes a control subfield for each frequency band of the subset of frequency bands and a channel bitmap that indicates the channel availability information of each frequency band.

6. The apparatus according to claim 1, wherein:
   a control ID field of the uplink frame indicates that the uplink frame includes the MB-BQR.

7. The apparatus according to claim 1, the processing circuitry further configured to:
   encode, for transmission to the STA, a frame that includes a physical (PHY) capabilities information field; and
   encode the PHY capabilities information field to include a field that indicates whether the AP supports exchange of the MB-BQRP and the MB-BQRs.

8. The apparatus according to claim 1, the processing circuitry further configured to:
   encode, for transmission to the STA, capability information configurable to indicate that the STA is permitted to send unsolicited MB-BQRs; and
   decode uplink frames from the STA that include the unsolicited MB-BQRs.

9. The apparatus according to claim 1, the processing circuitry further configured to encode the TF for transmission in a single frequency band of the plurality of frequency bands.

10. The apparatus according to claim 1, wherein the uplink frame from the STA is received in a single frequency band of the plurality of frequency bands.

11. The apparatus according to claim 1, wherein the AP is arranged to operate in accordance with an Extremely High Throughput (EHT) protocol.

12. The apparatus according to claim 1, wherein:
    the processing circuitry includes a baseband processor to encode the TF,
    the apparatus further comprises a transceiver to transmit the TF, and
    the memory is configured to store at least a portion of the TF.

13. A non-transitory computer-readable storage medium of an access point (AP) that stores instructions for execution of operations by processing circuitry, wherein the AP is configurable to operate in a plurality of frequency bands, wherein the operations configure the processing circuitry to:
    from the plurality of frequency bands, select a subset of frequency bands for which the AP is to request, from a station (STA), per-band buffer status reports (BSRs) that indicate per-band information related to data sizes to be sent by the STA;
    encode, for transmission, a Trigger Frame (TF) for a multi-band BSR polling (MB-BSRP) to request the per-band BSRs,
    wherein the operations further configure the processing circuitry to encode the TF to indicate the subset of frequency bands;
    decode, from the STA, an uplink frame that includes a multi-band BSR (MB-BSR) that indicates the per-band BSRs; and
    determine, based on the MB-BSR, for an uplink transmission by the STA:

one or more frequency bands of the subset of frequency bands, and one or more corresponding channels.

14. The non-transitory computer-readable storage medium according to claim 13, the operations to further configure the processing circuitry to encode the TF to include a TF type parameter, wherein the TF type parameter is configurable to indicate that the TF is for the MB-BSRP.

15. The non-transitory computer-readable storage medium according to claim 13, the operations to further configure the processing circuitry to:

encode the TF to include a Trigger Dependent User Information subfield that includes a requesting bands parameter; and encode the requesting bands parameter to indicate the subset of frequency bands.

16. The non-transitory computer-readable storage medium according to claim 13, the operations to further configure the processing circuitry to encode the TF for transmission in a single frequency band of the plurality of frequency bands.

17. The non-transitory computer-readable storage medium according to claim 13, wherein the uplink frame from the STA is received in a single frequency band of the plurality of frequency bands.

18. An apparatus of a station (STA) configurable for multi-band operation in a plurality of frequency bands, wherein each of the frequency bands comprises one or more channels, wherein the apparatus comprises: memory; and processing circuitry, configured to:

encode, for transmission to an access point (AP), an uplink frame that includes a control field, wherein the processing circuitry is further configured to encode the control field to indicate one or more operating mode (OM) changes at the STA, wherein the processing circuitry is further configured to encode the control field to indicate a time duration after which the one or more OM changes are to be in effect at the STA; and encode an uplink frame for transmission after the indicated time duration and in accordance with the indicated one or more OM changes.

19. The apparatus according to claim 18, wherein the control field is configurable to indicate per-band OM changes for one or more of the frequency bands.

* * * * *